(12) United States Patent
Erill et al.

(10) Patent No.: US 7,987,600 B2
(45) Date of Patent: Aug. 2, 2011

(54) DEVICE AND METHOD FOR FITTING A SEAL INTO A SEAT IN A WIND TURBINE

(75) Inventors: Daniel Garcia Erill, Barcelona (ES); Mikel Perez Rodriguez, Barcelona (ES)

(73) Assignee: Ecotecnia, s.coop.c.l, Barcelona (ES)

( * ) Notice: Subject to any disclaimer, the term of this patent is extended or adjusted under 35 U.S.C. 154(b) by 1280 days.

(21) Appl. No.: 11/606,765

(22) Filed: Nov. 30, 2006

(65) Prior Publication Data

US 2008/0104821 A1 May 8, 2008

(51) Int. Cl.
*B21D 53/10* (2006.01)
(52) U.S. Cl. ... 29/898.07; 29/235; 29/281.3; 29/402.01; 29/402.02; 29/450; 29/898.11; 277/345
(58) Field of Classification Search ............... 29/898.11, 29/898.07, 402.02, 402.01, 450, 235, 281.3; 277/345
See application file for complete search history.

(56) References Cited

U.S. PATENT DOCUMENTS

| 1,159,645 | A | * | 11/1915 | Brown | 400/448 |
| 4,274,807 | A | * | 6/1981 | Kenney | 416/48 |
| 6,732,950 | B2 | * | 5/2004 | Ingham et al. | 239/205 |

FOREIGN PATENT DOCUMENTS

| DE | 10309383 | 9/2003 |
| FR | 2572123 | 4/1986 |
| JP | 2003240124 | 8/2003 |

\* cited by examiner

*Primary Examiner* — Rick K Chang
(74) *Attorney, Agent, or Firm* — Shook, Hardy & Bacon L.L.P.

(57) ABSTRACT

The device comprises at least one pressing member and an attachment member for attaching it to a wind turbine part, for example, a blade root, which may have a relative movement with regard to a first part, for example, a bearing in a pitch blade mechanism, the first part having a seat into which the joint is to be fitted. Upon relative rotation between the first parts, the pressing member presses the seal into the seat. A method for fitting the seal into the seat is also provided. Operations of maintenance or partial or complete replacement of the seal can be carried out in situ on the wind turbine and also on pitch bearing manufacturing easily and effectively.

14 Claims, 3 Drawing Sheets

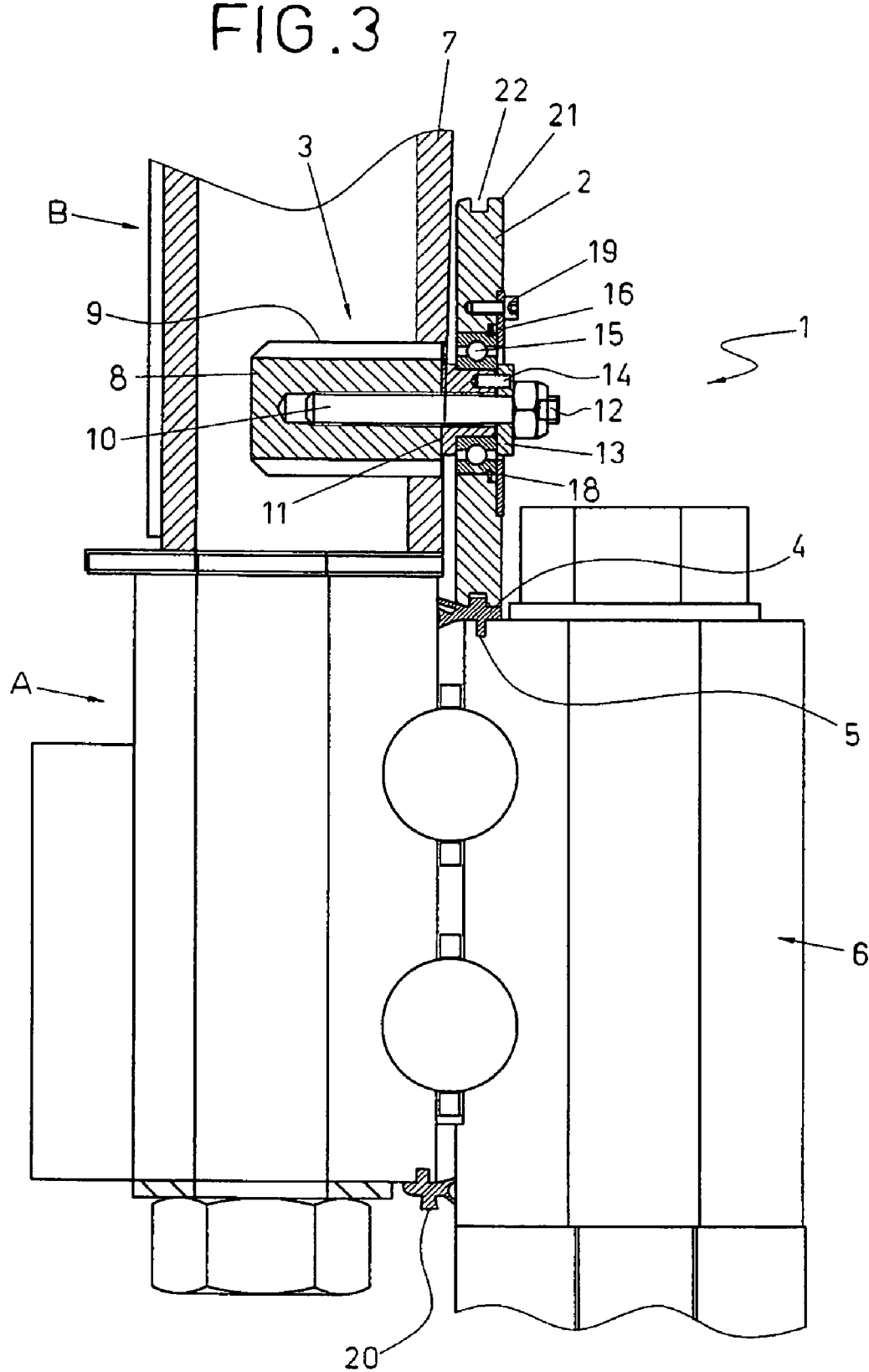

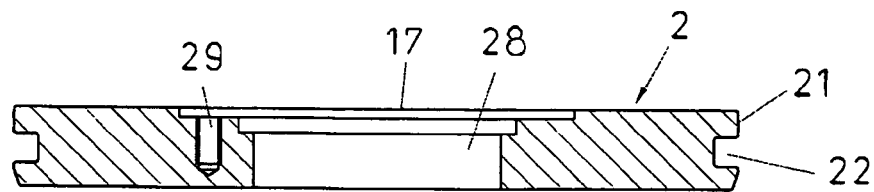
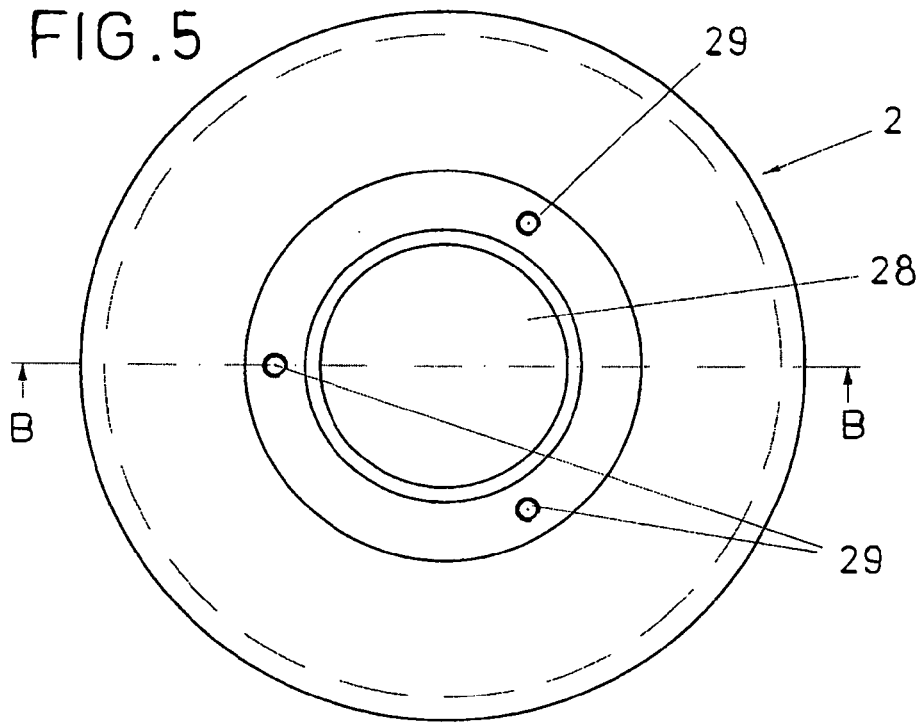
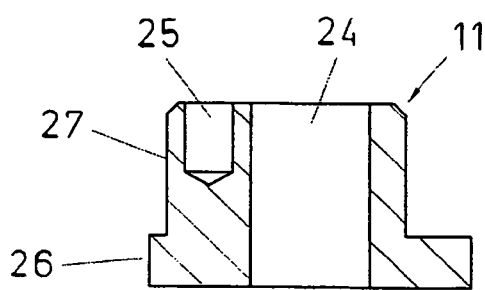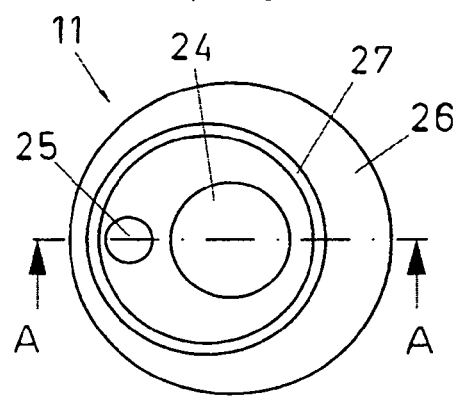

DEVICE AND METHOD FOR FITTING A SEAL INTO A SEAT IN A WIND TURBINE

CROSS-REFERENCE TO RELATED APPLICATIONS

This application claims priority to European Patent Application No. EP06123400 filed Nov. 2, 2006.

FIELD OF THE INVENTION

The present invention relates to a device for fitting a seal in which a pressing member acts on the seal. More particularly, the invention provides a device for fitting a seal into a seat formed in a first part of a wind turbine. The device is suitable for operations of maintenance or partial or complete replacement of the sealing.

A method for fitting a seal into a seat in a first part of a wind turbine is also provided.

BACKGROUND OF THE INVENTION

A pitch blade mechanism in a wind turbine acts on the blades of a wind turbine rotor for changing their respective angles to achieve the maximum power. For this reason, blades are pivotally guided about an axis by bearings. Thus, the pitch blade mechanism requires the provision of a seal to prevent lubricant from leaking out and to prevent dust, water, and other contaminants from entering the pitch blade mechanism. The wind turbine pitch blade mechanism is usually provided with an outer seal and an inner seal.

A sealing for this purpose is described in DE 10309383 that shows a pitch mechanism having roller bearings for each blade root. The interface between the blade root and the bearing within the hub is surrounded by a protective shell ring made of a non-corroding material, and the interface between the shell and the adjoining components is protected by an overlapping elastic shell seal.

Wind turbine bearings are generally designed for twenty years of lifetime. Seals that retain grease inside the bearing and protect it from different weather and contamination conditions, however, are not designed for such a lifetime. Therefore, such seals should be replaced with new ones periodically due to wear, dust, etc. Exact seal lifetime is not easily determined as it depends mainly on weather and contamination conditions, but as a reference, seals may be replaced every three years.

Disassembling of an old seal from the wind turbine pitch bearing in situ or during pitch bearing manufacturing is currently very easy and quick as a seal is only needed to be pulled out from a bearing groove or seat.

However, assembling a new seal into a wind turbine pitch bearing mechanism in situ (for example, when it is necessary for a seal to be replaced) or during pitch bearing manufacturing is currently a very difficult and slow operation. Such an in situ operation on a wind turbine usually involves an operator working at a height of over 70 meters from the ground, this being a risky working condition, and taking into account that operations have to be performed outside the hub and around 360° of the blade root.

One method for facilitating the operator insertion of the seal into the bearing groove or seat of a wind turbine pitch bearing mechanism uses manually operated tools. However, they are time consuming and capital intensive because of high technical labor costs involved. Time required for the assembling of a new seal using manually operated tools involves undesirably long downtimes in which no electricity is produced by the wind turbine.

Still a further disadvantage in known seal assembling operations in wind turbines is that they require a lot of free space inside the wind turbine (i.e., the deflector) so that the operator may freely move. This is an especially significant issue when an outer seal is to be fitted into the seat of a wind turbine pitch bearing mechanism. This means that larger deflectors need to be made so that the operator can work comfortably, thus involving higher costs.

Japanese Patent No. JP2003240124 shows a device for disassembling an old seal from a pitch bearing either in situ on a wind turbine or during pitch bearing manufacturing. However, it does not teach about seal assembling operations.

French Patent No. FR2572123 discloses a device for assembling joints on windows or the like in which the seal is directly fixed into a groove of a crossbar or strut by means of jacks and a small wheel pushing the seal into the groove. Two driving rollers are provided to move the wood forward along the machine. This device is only applicable to elements made out of wood, aluminum, or certain joinery elements made out of plastics.

BRIEF SUMMARY OF THE INVENTION

The present invention provides a device for fitting a seal into a seat in a first part of a wind turbine in operations of maintenance or partial or complete replacement of such sealing.

More particularly, the device comprises at least one pressing member and am attachment mechanism attaching the pressing member to a second part of the wind turbine. The first part and the second part of the wind turbine may be moved to each other such that, upon relative rotation between said first and second parts, the seal is pressed by the pressing member into the seat.

The second part of the wind turbine where the pressing member is attached may be the blade root of a wind turbine rotor or an extender root of a wind turbine blade.

In one embodiment of the device of the present invention, the pressing member is rotatably mounted on the second part of the wind turbine. This pressing member may be either a wheel or roller made, for example, of polyamide (nylon) or any other material suitable to avoid damage on the seal and capable of sufficiently pressing onto the joint.

In use, the wheel presses against the seal outer surface. Taking advantage of the rotor rotational movement, the wheel runs over the seal, forcing it to be inserted inside the seat provided in the above-mentioned first part, for example, the bearing of the wind turbine pitch blade mechanism.

The pressing member may be shaped so as to have a groove formed on the outer surface thereof. The groove has a profile that is shaped complementarily to that of the outer surface of the seal. The wheel or roller, therefore, is guided by the seal during operation.

In a further embodiment of the invention, the pressing member is eccentrically rotatably mounted to the second part of the wind turbine. Therefore, the required pressure on the seal can be accurately adjusted.

This invention further relates to a method for fitting a seal into a seat in a first part of a wind turbine. The method comprises placing a seal into the seat and causing at least a pressing member to press the seal joint into the seat by causing relative rotation between the first part of the wind turbine and a second part to which the pressing member is attached.

The method may further comprise attaching the pressing member to the second part of the wind turbine. Removing the pressing member from said second part of the wind turbine may also be performed.

The device provided by the invention has an easy operation and functionality by which seals can be replaced quickly and safely. The device can be operated by the operator without physical effort, making it possible to reduce operation time and, therefore, the time the wind turbine is stopped for such operations of maintenance or replacement. In addition, the device has a simple design such that it can be operated within a very small place, thus making possible the required deflector size to be reduced.

With the device and the method of the invention, operations of maintenance or partial or complete replacement of the seal can be carried out in situ on the wind turbine and also on pitch bearing manufacturing easily and effectively. Numerous other features, objects, and advantages of the invention will become apparent from the following description when read in conjunction with the accompanying drawings.

BRIEF DESCRIPTION OF THE DRAWINGS

A particular embodiment of the present invention will be described in the following, only by way of non-limiting example, with reference to the appended drawings, in which:

FIG. 3 is fragmentary enlarged elevation view of one embodiment of a device according to the invention;

FIG. 4 is a sectional view taken along line B-B in FIG. 5 of one embodiment of the pressing member of the device in FIG. 3;

FIG. 5 is an elevation view of the pressing member in FIG. 3;

FIG. 6 is a sectional view taken along line A-A in FIG. 7 of an eccentric bush; and FIG. 7 is a top view of the eccentric bush of FIG. 6.

DETAILED DESCRIPTION OF THE INVENTION

Figure 1:
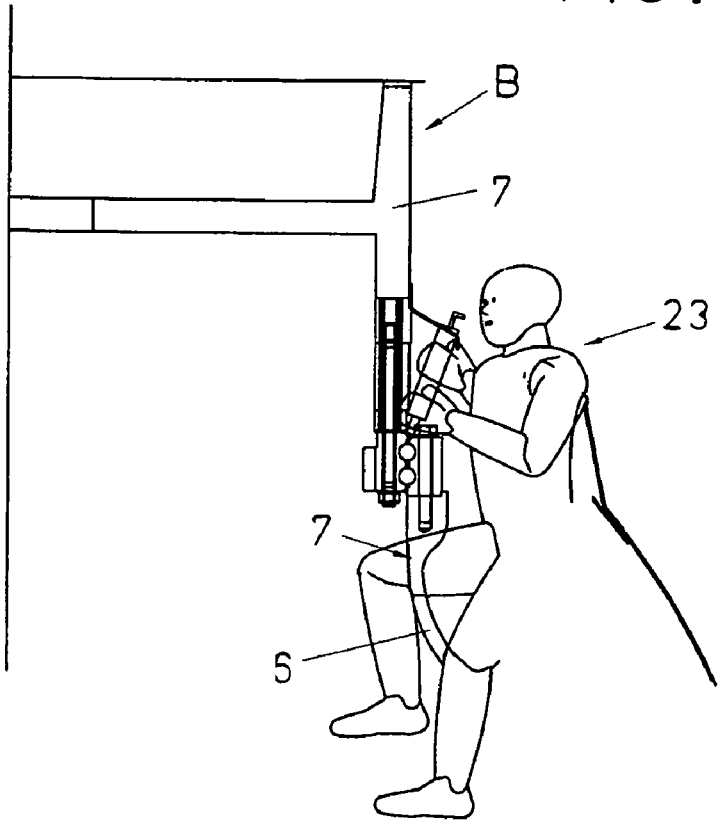
FIG. 1 is a diagrammatic view showing an operator inside a wind turbine deflector who is fitting a seal in a first part of the wind turbine by using a prior art manually operated tool.
Figure 2:
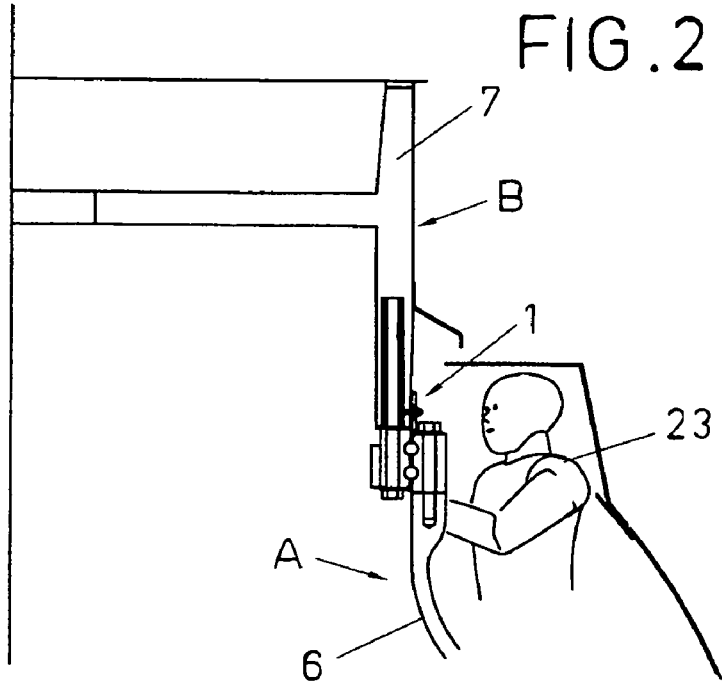
FIG. 2 is a diagrammatic view showing an operator inside a wind turbine deflector fitting a seal in a first part of the wind turbine by using the device of the invention.

A device for fitting a seal into a seat in a first part of a wind turbine is shown in detail in FIG. 3 of the drawings. The device has been indicated as a whole with reference numeral 1 and it is suitable in operations of maintenance or partial or complete replacement of the sealing.

The device 1 in the embodiment of FIG. 3 comprises a pressing member 2 in the form of a wheel and attachment mechanism 3 for attachment of said pressing member 2 to a part of the wind turbine as it will be explained further on.

The seal, indicated at 4 in the drawings, has to be fitted into a seat 5 formed in a first part A of the wind turbine. In the embodiment shown, said first part A corresponds to the bearing 6 of a wind turbine pitch blade mechanism. The bearing 6 in said pitch blade mechanism is provided with the outer seal 4 and an inner seal 20. The embodiment of the device 1 herein described is suitable for fitting the outer seal 4 in the bearing 6.

The device 1 is attached by attachment mechanism 3 to a second part B of the wind turbine which, in the embodiment shown, is the blade root 7 of the wind turbine.

The first part A and the second part B of the wind turbine may be moved to each other. Upon relative rotation between said first and second parts A, B, the seal 4 is pressed by the pressing member 2 into the seat 5 of the bearing 6.

The attachment mechanism 3 for attachment of the pressing member or wheel 2 to the second part B of the wind turbine comprises a metallic, inwardly threaded insert 8. The insert 8 is fitted into a hole 9 formed in said second part B of the wind turbine, that is, the blade root 7. Insert 8 is only needed in the case the blade root 7 is made out of composite materials such as fiberglass, carbon, Kevlar, etc. Otherwise, insert 8 would not be needed in the case the device 1 is to be attached to a steel blade extender (not shown), since a shaft for the wheel 2 may be directly threaded in a threaded hole formed therein.

In the embodiment shown in the figures, in which the device 1 is attached to a blade root 7, the attachment mechanism 3 for attachment of the wheel 2 to said blade root 7 further includes a stud 10 that is threadingly received into the insert 8. The stud 10 is a hexagon socket type stud so that it can be suitably screwed in.

An eccentric bush 11 is mounted around the stud 10, and it is prevented from being rotated by two flat surfaces (not shown) formed on stud 10.

A self-locking nut 12 is screwed in one free end of the stud 10 pushing a locking washer 13 provided between the eccentric bush 11 and the self-locking nut 12. The locking washer 13 is provided with a locking pin 14 that prevents the eccentric bush 11 from being rotated.

FIGS. 6 and 7 show the above-mentioned eccentric bush 11. Particularly, the eccentric bush 11 has a first central hole 24 for receiving the stud 10 and an offset hole 25 for receiving the locking pin 14, as shown in FIG. 7. FIG. 6 shows the sectional view of the eccentric bush 11 as having a first portion 26 which abuts the blade root 7 of the wind turbine (second part B) and a second portion 27 that is smaller in diameter than first portion 26. In use, this second portion 27 of the eccentric bush 11 receives a ball bearing 15 that is inserted into the central hole 28 of the wheel 2. The pressing member or wheel 2 is rotatably mounted on the blade root 7 of the wind turbine (second part B) by ball bearing 15 that reduces frictional forces on wheel rotation.

A seger elastic ring 16 is fitted in a recess 17 in the wheel 2. The seger elastic ring 16, along with a cover 18, prevents the wheel 2 from working its way out of the bearing 15. The cover 18 is fixed to the wheel 2 by three screws 19 screwed in corresponding threaded holes 29.

As the wheel 2 is eccentrically mounted in the second part B of the wind turbine, the required pressure of the wheel 2 on the seal 4 can be accurately adjusted.

The second part B of the wind turbine, for example, the blade root, the extender root, etc., may have one or more metallic, inwardly threaded inserts 8 therein for fixing the device 1 in one or different positions around 360° on the side surface of said second part B of the wind turbine.

As shown in FIG. 4, the outer radial surface 21 of the wheel 2 is shaped so as to have a groove 22. Groove 22 in the wheel 2 has a profile that is shaped complementarily to that of the outer surface of the seal 4. This makes the wheel 2 to be guided by the seal 4 as the wheel 2 is passed thereon.

The wheel 2 is made out of polyamide (nylon) or any other material suitable to avoid damage on the seal 4 and to be capable of sufficiently pressing onto said seal 4.

For replacing an old outer seal 4 with a new seal 4, an operator 23 first removes the old outer seal 4 and places a new seal 4 into the seat 5 formed in the first part A of the wind turbine.

The operator 23 then attaches the device 1 to the blade root 7 (part B) of the wind turbine by screwing the stud 10 in the insert 8 that is provided inside the blade root 7. The wheel 2 and the insert 8 are then placed on the stud 10 with the corresponding locking pin 14. Locking nut 12 is then screwed in around the stud 10, thus locking the wheel 2 and preventing it from coming off the stud 10.

Once the device 1 is attached to part B, second part B, along with the device 1, is rotated relative to the bearing 6 of the pitch blade mechanism (part A) of the wind turbine by operating the pitch blade mechanism. As this rotating movement between parts A, B is performed, the wheel 2 presses the seal 4 into the seat 5. In the embodiment shown, advantage of the rotor rotational movement is taken so that the wheel 2 runs over the seal 4 forcing it to be inserted inside the seat 5 provided in the first part A. The blade is rotated by the blade pitch mechanism control of the wind turbine through which movement direction, traveled angle, and rotational speed can be set.

The wheel 2 may be passed onto the outer seal 4 surface in several runs as necessary until the seal 4 has been properly fitted into the seat 5 of the bearing 6. Once the seal 4 has been fitted, the device 1 is removed from second part B of the wind turbine by the operator 23.

Once the seal 4 has been properly placed into seat 5 and ready for operation, device 1 may be removed from the second part B of the wind turbine by unscrewing the locking nut 12 from the stud 10 and removing the eccentric bush 11 along with the wheel 2. A plug (not shown) can be placed to close the inside of the insert 8 when the device 1 is out of the second part B of the wind turbine. The plug protects the inside of the insert 8 from dirt, corrosion, and other external agents that could damage it when the device 1 is not installed.

There has been described a sealing system that is particularly applicable to a wind turbine. It should be understood that the particular embodiments shown in the drawing and described within this specification are for purposes of example and should not be construed to limit the invention, which will be described in the claims below. Further, it is evident that those skilled in the art may now make numerous uses and modifications of the specific embodiments described, without departing from the inventive concepts. Equivalent structures and processes may be substituted for the various structures and processes described; the subprocesses of the inventive method may, in some instances, be performed in a different order, or a variety of different materials and elements may be used. Consequently, the invention is to be construed as embracing each and every novel feature and novel combination of features present in and/or possessed by the sealing mechanism and method described.

What is claimed as new and desired to be protected by Letters Patent of the United States is:

1. A device for fitting a seal into a seat in a first part of a wind turbine, said device comprising at least one pressing member and an attachment mechanism for attachment of said pressing member to a second part of the wind turbine having a relative movement with regard to said first part such that upon relative rotation between said first and second parts, the pressing member of the device presses the seal into the seat.

2. The device as claimed in claim 1 wherein said first part of the wind turbine is a bearing in a wind turbine pitch blade mechanism.

3. The device as claimed in claim 1 wherein said second part of the wind turbine is a blade root of the wind turbine rotor.

4. The device as claimed in claim 1 wherein said second part of the wind turbine is an extender root of a wind turbine blade.

5. The device as claimed in claim 1 wherein the pressing member is rotatably mounted on said second part of the wind turbine.

6. The device as claimed in claim 1 wherein said pressing member is a wheel or roller.

7. The device as claimed in claim 6 wherein said pressing member is provided with a groove having a profile shaped complementarily to that of an outer surface of the seal.

8. The device as claimed in claim 5 wherein said pressing member is eccentrically rotatably mounted to said second part of the wind turbine so that a required pressure on the seal can be adjusted.

9. The device as claimed in claim 6 wherein said pressing member is made of polyamide.

10. The device as claimed in claim 1 wherein said pressing member is made of polyamide.

11. A method for fitting a seal into a seat in a first part of a wind turbine, the method comprising the steps of:
    placing a seal into the seat;
    providing a second part with a pressing member attached thereto; and
    relatively rotating the first part of the wind turbine and the second part to press the seal into the seat using the pressing member.

12. The method as claimed in claim 11 wherein said method further comprises attaching said pressing member to said second part of the wind turbine prior to said pressing.

13. The method as claimed in claim 11 wherein said method further comprises a step of removing said pressing member from said second part of the wind turbine.

14. The method as claimed in claim 11 wherein said method further comprises removing said pressing member from said second part of the wind turbine.

* * * * *